US008068854B2

(12) United States Patent
Contractor (10) Patent No.: US 8,068,854 B2
(45) Date of Patent: *Nov. 29, 2011

(54) LOCATION-BASED FORWARDING OF A COMMUNICATION

(75) Inventor: Sunil H. Contractor, Marietta, GA (US)

(73) Assignee: AT&T Intellectual Property I, LP

( * ) Notice: Subject to any disclaimer, the term of this patent is extended or adjusted under 35 U.S.C. 154(b) by 0 days.

This patent is subject to a terminal disclaimer.

(21) Appl. No.: 12/646,461

(22) Filed: Dec. 23, 2009

(65) Prior Publication Data

US 2010/0098237 A1    Apr. 22, 2010

Related U.S. Application Data

(63) Continuation of application No. 11/276,392, filed on Feb. 27, 2006, now Pat. No. 7,664,510, which is a continuation of application No. 09/939,855, filed on Aug. 27, 2001, now Pat. No. 7,006,833.

(51) Int. Cl.
  *H04W 24/00* (2009.01)
  *H04M 3/42* (2006.01)
(52) U.S. Cl. ................................ 455/456.1; 455/417
(58) Field of Classification Search .................. 455/461, 455/459, 456.1–456.6, 417–420, 445; 379/211.01, 379/211.02, 214.01, 213.01
  See application file for complete search history.

(56) References Cited

U.S. PATENT DOCUMENTS

| | | | |
|---|---|---|---|
| 5,428,663 A * | 6/1995 | Grimes et al. ............... 340/7.21 |
| 5,493,692 A | 2/1996 | Theimer et al. | |
| 5,742,906 A * | 4/1998 | Foladare et al. ............... 455/461 |
| 5,825,864 A | 10/1998 | McGraw et al. | |
| 5,924,027 A * | 7/1999 | Valentine et al. ............. 455/417 |
| 5,928,325 A | 7/1999 | Shaughnessy et al. | |
| 5,978,673 A | 11/1999 | Alperovich et al. | |
| 6,038,451 A * | 3/2000 | Syed et al. ..................... 455/445 |
| 6,259,782 B1 * | 7/2001 | Gallant .................... 379/211.01 |
| 6,320,534 B1 | 11/2001 | Goss | |
| 6,332,082 B1 | 12/2001 | Fuller et al. | |
| 6,363,248 B1 | 3/2002 | Silverman | |
| 6,393,288 B1 * | 5/2002 | Sollee et al. .................. 455/445 |
| 6,405,042 B1 * | 6/2002 | Akhteruzzaman et al. ... 455/445 |
| 6,501,948 B1 * | 12/2002 | Salin ............................ 455/417 |
| 6,584,316 B1 | 6/2003 | Akhteruzzaman et al. | |
| 6,603,973 B1 * | 8/2003 | Foladare et al. .............. 455/445 |
| 6,705,916 B2 | 3/2004 | Roberts et al. | |
| 6,804,343 B2 * | 10/2004 | Hafez ...................... 379/211.01 |
| 6,813,346 B2 * | 11/2004 | Gruchala et al. ......... 379/211.01 |
| 6,856,806 B1 * | 2/2005 | Bosik et al. .................... 455/445 |

(Continued)

OTHER PUBLICATIONS

Official Action dated Mar. 30, 2004 in U.S. Appl. No. 09/939,855.

(Continued)

*Primary Examiner* — Brandon Miller
(74) *Attorney, Agent, or Firm* — Hope Baldauff Hartman, LLC (57) ABSTRACT

The invention provides a method and a system for forwarding a telephone call. The inventive method includes receiving a telephone call from a calling party line to a called party line, determining a location of the called party, determining a proximity of the location of the called party to one or more subscriber locations, and directing the telephone call to the one or more subscriber locations based on the determined proximity. The subscriber locations may be predefined by the called party. The location of the called party may be determined using a global position system and/or a radio frequency signal, for example.

20 Claims, 8 Drawing Sheets

U.S. PATENT DOCUMENTS

| | | | |
|---|---|---|---|
| 7,006,833 B1 * | 2/2006 | Contractor | 455/456.1 |
| 7,162,237 B1 * | 1/2007 | Silver et al. | 455/432.3 |
| 7,215,968 B2 * | 5/2007 | Fujiwara | 455/456.3 |
| 7,363,041 B2 * | 4/2008 | Bonnard et al. | 455/456.1 |
| 7,664,510 B1 * | 2/2010 | Contractor | 455/456.1 |
| 7,693,512 B1 * | 4/2010 | West | 455/417 |
| 2003/0008642 A1 * | 1/2003 | Punjabi | 455/417 |
| 2004/0185838 A1 * | 9/2004 | Seligmann | 455/417 |

OTHER PUBLICATIONS

Official Action dated Nov. 3, 2004 in U.S. Appl. No. 09/939,855.
Official Action dated Jul. 11, 2005 in U.S. Appl. No. 09/939,855.
Notice of Allowance dated Nov. 29, 2005 in U.S. Appl. No. 09/939,855.
Official Action dated Mar. 13, 2007 in U.S. Appl. No. 11/276,392.
Official Action dated Oct. 2, 2007 in U.S. Appl. No. 11/276,392.
Official Action dated May 21, 2008 in U.S. Appl. No. 11/276,392.
Official Action dated Nov. 25, 2008 in U.S. Appl. No. 11/276,392.
Official Action dated Jun. 4, 2009 in U.S. Appl. No. 11/276,392.
Notice of Allowance dated Dec. 16, 2009 in U.S. Appl. No. 11/276,392.

* cited by examiner

LOCATION-BASED FORWARDING OF A COMMUNICATION

CROSS-REFERENCE TO RELATED APPLICATIONS

This application is a continuation of U.S. application Ser. No. 11/276,392, now U.S. Patent No. 7,664,510 filed Feb. 27, 2006, which is a continuation of U.S. application Ser. No. 09/939,855, now U.S. Pat. No. 7,006,833, filed on Aug. 27, 2001, which are expressly incorporated herein by reference in their entirety.

TECHNICAL FIELD

The invention relates generally to the forwarding of a communication based on a detected location, and more particularly to the forwarding of telephone calls to a certain location based on the detected location of a subscribing customer.

BACKGROUND OF THE INVENTION

For some time the telecommunications industry has provided services to allow a subscriber to receive calls while away from a "subscribed" location. For example, "call forwarding" is a service that allows a subscriber to redirect calls directed to a residence or place of work, for example. In addition, the wireless telephone permits a user to receive calls at any location. These solutions have migrated from specialty services, directed to frequently traveling businesspersons, to nearly all telephone users.

For many, however, call forwarding services often are too complicated to set up and too limited in their capabilities. For example, traditional call forwarding required the subscriber to remember to designate the forwarded locations before leaving the place from which calls were to be forwarded. As a result, if the subscriber forgot to activate the call forwarding service before leaving home, for example, the subscriber would have to return to home to do so. Of course, this was often an unacceptable alternative. "Flexible Call Forwarding" offered an improved solution over traditional call forwarding. Flexible Call Forwarding permitted the user to redirect calls from one location to another, using any station in the telecommunications network. However, even with Flexible Call Forwarding, a subscriber must actively enter instructions to the telephone network.

In addition, although wireless telephones offer a viable alternative to call forwarding, for many users wireless telephones are not yet reliable enough to replace the home or business telephone as the primary or sole point of contact. As a result, attempting to contact a person often requires a call to their home telephone, followed by a call to their work telephone, followed by a call to their wireless telephone.

Therefore, there is a need to provide a technique for forwarding a communication based on the location of the receiving customer.

SUMMARY OF THE INVENTION

The invention provides a method and a system for forwarding a telephone call. The inventive method includes receiving a telephone call from a calling party line to a called party line, determining a location of the called party, determining a proximity of the location of the called party to one or more subscriber locations, and directing the telephone call to the one or more subscriber locations based on the determined proximity. The subscriber locations may be predefined by the called party. The location of the called party may be determined using a global position system and/or a radio frequency signal, for example. The subscriber locations may be identified by a directory number and include any of the following: a wire line telephone, a public pay telephone, and/or a wireless communication device. The inventive method may further include forwarding the telephone call to a wireless communication device, a voice mail system, and/or another user, based on the determined proximity. The proximity of the called party to the subscriber location may be determined by at least one of the following: a service node, a customer premise equipment unit, a service control point, a location detection device, and/or positioning determining entity (PDE), but is not limited to these devices.

The inventive system includes a transponder for transmitting a location of a user. The transponder may be a GPS-based device and/or a radio frequency-based device, for example. The transponder may be a part of a handset device, or any other computing component. The system further includes a service control point for comparing a predetermined designator with the location of the user, and a service transfer point in communication with the service control point for directing a communication as a function of the comparison. The system further may include one or more subscriber telephones in communication with the service switching point. The transponder may communicate the location of the user to any point in the telecommunications network, including the subscriber telephones, the service control point, and a service node that may be in communication with the service control point.

The invention further provides a method of providing for the forwarding of a communication. The method includes receiving a signal identifying a location of a subscriber, receiving a first designator from the subscriber identifying a first subscriber location, receiving a second designator for the subscriber identifying a second subscriber location, and storing the first designator and the second designator. The inventive method may further comprise comparing the location of the subscriber with a location of the first designator and with a location of the second designator. Once the comparison is conducted, the method may include forwarding a communication directed to the first designator to the second designator, and/or forwarding a communication directed to the first designator to the first designator, as a function of the comparison.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

Telecommunications System Overview

Figure 1:
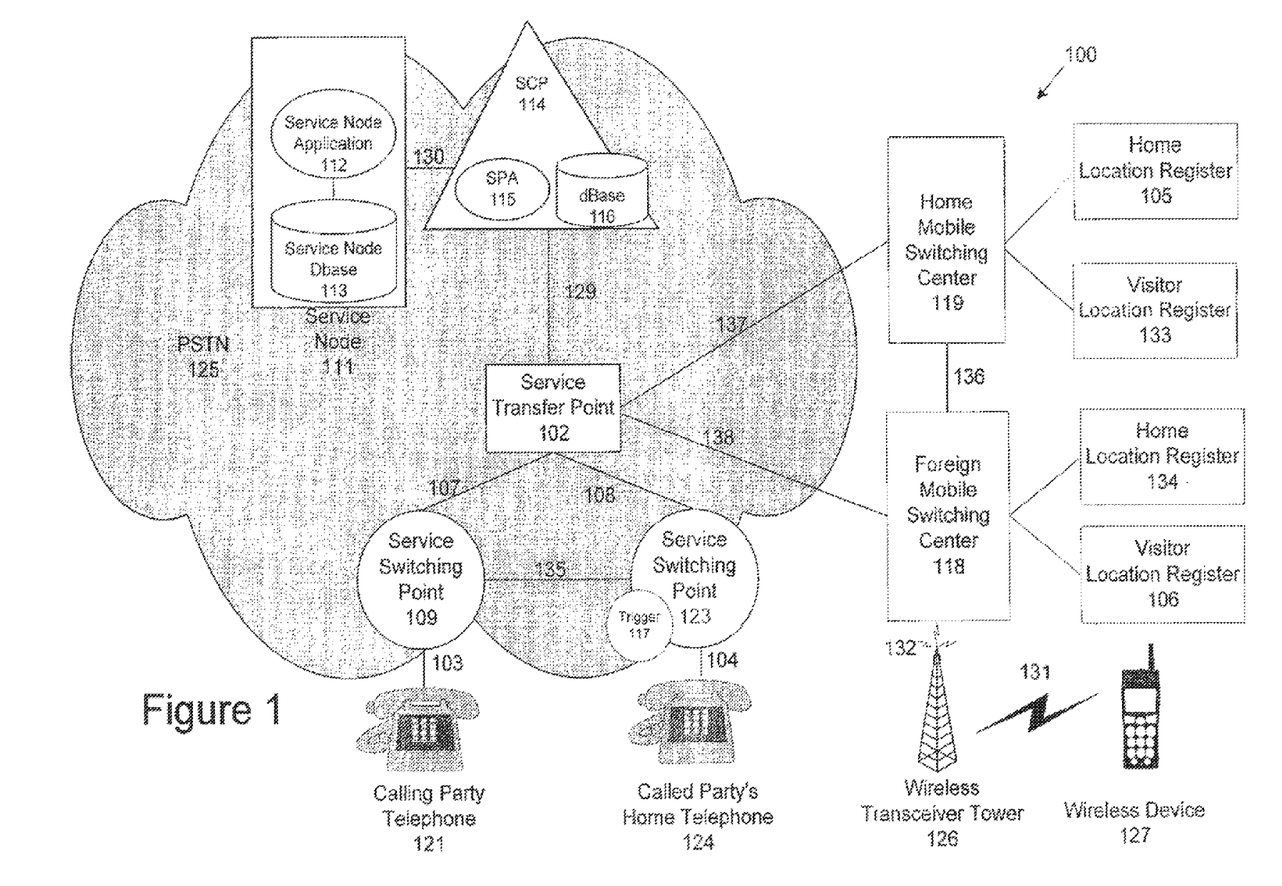
FIG. 1 is a block diagram of a telecommunications network well known to those skilled in the art.

FIG. 1 provides a block diagram of a telecommunications network 100 well known to those skilled in the art. Telecommunications network 100 includes both wire line and wireless portions. Although a complete telecommunications network may include other devices that are not shown in FIG. 1, the components illustrated in FIG. 1 provide a brief overview of the components relevant to provide a context for the invention.

As shown in FIG. 1, a calling party telephone 121 is in communication with a service switching point (SSP) 109. Also, a called party's home telephone 124 is in communication with a SSP 123. SSP 109 and 123 are in communication with a Service Transfer Point (STP) 102. STP 102 is in communication with a Service Control Point (SCP) 114. SCP 114 is in communication with a Service Node (SN) 111. SCP 114, SN 111, STP 102, SSP 109, and SSP 123 are all part of a public service telephone network (PSTN) 125, a term well known to those skilled in the art. Although SSP 109 and 123 may be in communication with different STPs, FIG. 1 illustrates SSP 109 and 123 in communication with the same STP 102 for the purposes of clarity and brevity.

It should be appreciated that a party making a telephone call, or initiating any kind of communication, is referred to herein as the "calling party." The party intended to be communicated with by the calling party is referred to herein as the "called party." The telephone number associated with the telephone of the calling party is referred to herein as the "calling number." The telephone number associated with the telephone of the called party is referred to herein as the "called number." Each of the party's may have numerous telephone devices. For example, a called party's telephone may be described as a "home telephone," "work telephone," and "wireless telephone," for example.

Calling party telephone 121 and called party's home telephone 124 represent "subscriber locations." The subscriber locations may connect certain customer premise equipment (CPE), like telephone stations, facsimile machines, computers, modems. It should be appreciated that subscriber locations also may include wireless communication devices, like a wireless telephone, for example. Also, it should be appreciated that subscriber locations may include public telephones, like pay telephones, for example. Therefore, a subscriber location may include any termination on a network (wireless or wire line) that is capable of receiving and/or transmitting a communication on network 100.

Calling party telephone 121 and called party's home telephone 124 communicate with SSP 109 and SSP 123, respectively, over telephone lines 103 and 104. Telephone lines 103 and 104 are sometimes referred to as the "loop." Telephone lines 103 and 104 also may be referred to as a "calling line" and the terms will be used interchangeably. The term "communication" or "call" is used herein to include any data that may be exchanged between calling party telephone 121 and a called party 124 over a telephone system, and is not limited to voice-based communication.

Each active calling line is assigned a telephone number, which typically is a ten-digit identifier. The term "telephone number" is used in its generally understood meaning to be the number which is dialed or input into telephone's keypad by a calling party or source to reach a telephone station on a calling line associated with the dialed telephone number. A telephone number associated with telecommunications network 100 is referred to herein as a "wire line number." A telephone number associated with a wireless telephone system is referred to herein as a "wireless number." It should be appreciated that the invention may include communications directed to more than just telephone devices. In this case, the telephone number may be considered to be any designator capable of identifying a device on a network, analogous to an electronic mail (email) address, and/or interne protocol (IP) address, for example.

The STPs, SSPs, SCPs and SNs represent certain components that describe an Advanced Intelligent Network (AIN) based wire line telephone system, well known to those skilled in the art. In particular, the AIN is a particular type of telephone system with intelligent devices (e.g., STPs, SSPs, SCPs and SNs) that handle the messaging and routing of calls. These intelligent devices may also provide enhanced telecommunication features. Many of the intelligent devices are located in various central offices (CO) (not shown). The COs are interconnected by trunk lines. Trunk lines provide for voice and/or data communication, including for example, telephone calls between telephone users or data between fax machines. Trunk lines are also used by the COs to signal each other for messaging and routing information. In a wire line telephone system with AIN capabilities, intelligent devices are included in the telephone system to perform messaging and routing without using the trunk lines, thereby allowing more communication over the trunk lines.

In a typical application, when calling party telephone 121 dials a called number, the calling party's local SSP (i.e., SSP 109) communicates with the called party's SSP (i.e., SSP 123) over a trunk line 135. SSP 123 rings called party's home telephone 124. Each SSP serves a designated group of calling lines, and thus, the SSP that serves a particular calling line may be referred to as its "serving switch" or "local SSP." SSP 109 and 123 are each programmable switches that recognize AIN-type calls, launch queries to intelligent devices in the AIN (e.g., SCP 114), and receive instructions and data from the intelligent devices to further process and route calls. In particular, a trigger 117 is a flag or signaling interface that charges SSP 123 to launch a query to SCP 114 (via STP 102) for call processing instructions. Trigger 117 may be associated with a particular type of calling service, for example, call forwarding.

Subscriber locations may communicate to their SSPs through an additional private switching system, called a "private branch exchange" (PBX) (not shown). A PBX is the central switching component for a private communications network. It should be appreciated that although the invention is described in the context of the public service telephone network, the invention may be applied in the context of a private network as well.

SSP 109 and SSP 123 are also in communication with STP 102 via data links 107 and 108, respectively. Currently, data links 107 and 108 employ a signaling protocol referred to as Signaling System 7 (SS7), which is well known to those skilled in the art. The SS7 protocol is a layered protocol, which employs data packets, synonymously referred to as packets, information packets, message packets, or messages. STP 102 performs messaging and routing functions between its respective SSPs (i.e., SSP 109 and 123). Although each SSP is shown connected to one other STP for the purpose of brevity and clarity, it should be appreciated that each STP may be connected to several SSPs. When SSP 109 sends a message to another intelligent device on the AIN, SSP 109 will first send the message to its local STP 102. STP 102 will read the message and determine where to route the message. Typically, STP 102 will route the message to SCP 114. SCP 114 will then process the message and send a reply message to STP 102, for example. STP 102 will then route the reply message and send that reply message to SSP 109 for final disposition of the communication (e.g., routing the call to called party's home telephone 124).

Much of the service logic intelligence of the AIN system resides in SCP 114. SCP 114 is in communication with STP 102 over data link 129. SCP 114 includes a data store 116 and a Service Package Application (SPA) 115. In practice, SCP 114 includes a plurality of SPAs that are used in connection with or as part of data store 116 in the application of telecommunication services or enhanced features (e.g., toll-free "800" calling). SPA 115 typically is a series of computer-executable instructions located on a computer-readable medium that perform certain processes that facilitate a certain telephone service. The processes of SPA 115 often retrieve data, necessary to complete the appropriate processing from database 116.

In operation, SPA 115 resides on SCP 114 and provides the programmable SCP with intelligence (e.g., via computer-executable instructions) to process calls and queries sent from SSP 109 and 123 and other AIN devices. Therefore, SCP 114 receives messages from devices within the AIN system, processes the messages according to particular instructions of SPA 115, and returns a reply message to the appropriate device in the AIN system. The messages may include routing requests and/or enhanced features. An example of an enhanced feature available from SPA 115 is caller identification. In caller identification, the called party receives the identification (e.g., the calling name) of the calling party along with the call.

SCP 114 is in communication with SN 111 over data link 130. Communication over data link 130 typically is accomplished with an X.25 protocol or transmission control protocol/internet protocol (TCP/IP). In addition, SN 111 may be in communication with SSP 109 via Integrated Service Digital Network (ISDN) data links, well known to those skilled in the art. SN 111 is an interactive data system that may act as a switch to transfer calls, recognize telephone keypad inputs and voice commands, provide voice synthesis, and/or store messages, for example. SN 111 includes both voice and dual tone multi-frequency (DTMF) signal recognition devices and therefore can respond to both voice commands and telephone keypad commands. SN 111 further includes a voice synthesis device and therefore can annunciate various prompts to telephone stations. Voice synthesis is typically provided by a voice messaging system, described below in more detail.

SN 111 includes a data store 113. Data store 113 may be used to store audio messages and other data. Further, SN 111 may include service node applications (SNA) 112 that are used in connection with or as part of the data store 113 in the application of telecommunication services or enhanced features to calling lines. SN 111 may provide, for example, interactive help, collect voice information from calls, track calls, and provide indication, announcement, and messaging functions.

In order to keep the processing of data and calls as simple as possible, a relatively small set of triggers may be defined for each SSP, for example trigger 117 in SSP 123. Specific triggers also may be defined for each telephone number. A trigger is an event that generates a message to be sent to a device within the AIN or initiates some action to be taken by a device within the AIN. For example, trigger 117 may cause SSP 123 to send a query message to SCP 114, via STP 102, requesting instructions to process a call to called party's home telephone 124. SCP 114 may then query data store 116 for processing instructions with respect to a particular call. The results of the database inquiry are sent back to SSP 123 in a response from SCP 114 through STP 102.

The return message may include call processing instructions to SSP 123. The instructions may command SSP 123 to take some special action as a result of a customized calling service or enhanced feature, for example, forwarding a call to a voice messaging system. In response, SSP 123 may move through its call states, collect telephone keypad inputs, generate further messages, or route calls to complete the command issued by SCP 114.

Various triggers can by configured for each telephone number and/or for each SSP. Triggers may be configured to affect the calling party, the called party, or both. For example, an "off-hook" trigger may be set on the calling number. If this trigger is set, SSP 109 initiates a query to SCP 114 every time that calling number line is taken off-hook. SCP 114 then processes the query to determine how the call should be processed and replies to SSP 109 with instructions on how the call should be processed. Alternatively, a trigger may be set on the called line number, as with trigger 117, that will trigger an AIN message to be sent.

A telephone call may result in several statuses. A busy status occurs when called party's telephone 124 is busy or "off-hook." For example, the called party may currently be using the telephone. A no-answer status occurs when there is no answer on called party's telephone 124 after a predefined time. For example, the called party may not be near telephone 124 to answer. Alternatively, if the called party has forwarded their calls to a second telephone, a no-answer status will occur if there is no answer on the second telephone. An answer status occurs when the called party answers the telephone, for example, by taking telephone 124 off-hook in response to the telephone ringing. An answer status also occurs when an answering machine or voice messaging system answers the telephone call. Therefore, the predefined time is ideally set to trigger a no-answer status before an answering machine or a voice messaging system answers the call. If however, an answering machine or voice messaging system answers a call, an answer status will be triggered.

FIG. 1 also illustrates certain wireless components of telecommunications network 100. As shown in FIG. 1, a wireless device 127 (e.g., a wireless telephone) transmits and receives wireless signals 131 to and from a wireless transceiver tower 126. Although not shown in FIG. 1, it should be appreciated that wireless transceiver tower 126 may include a transmitter, receiver, antenna, signal amplifier and signal analyzer. These components are necessary to communicate and monitor wireless signals 131 between wireless device 127 and network 100.

Wireless transceiver tower 126 is in communication with a foreign mobile switching center (MSC) 118. Foreign MSC 118 is in communication with a Visitor Location Register (VLR) 106 and a Home Location Register (HLR) 134. Also, Foreign MSC is in communication with a Home MSC 119, both of which may be in communication with STP 102. It should be appreciated that Home MSC 119 may be in communication with Foreign MSC via an STP other than STP 102, but is shown as such for the purposes of clarity and brevity. Home MSC 119 is in communication with a HLR 105 and a VLR 133.

Wireless transceiver tower 126 covers a particular geographic region called a "cell." Wireless transceiver tower 126 may include sending capability and/or receiving capability. Each wireless transceiver tower 126 in a system has a limited number of speech (i.e., data) channels available for communication and at least one control channel for sending and receiving messaging and routing commands. Wireless device 127 may request a speech channel from wireless transceiver tower 126 by sending a message over a control channel. Wireless transceiver tower 126 may or may not grant the request depending on current speech channel occupancy.

Each wireless device 127 has one MSC assigned as its Home MSC 119. Each MSC typically has an associated HLR and a VLR, as shown in FIG. 1. Each HLR keeps data on each of the wireless devices assigned to Home MSC 119. Included in the data residing in HLR 105 is the on/off status of each wireless device 127 assigned to Home MSC 119. When wireless device 127 tries to communicate through an MSC that is not the user's Home MSC 119, the user is considered a "visiting" wireless telephone and is tracked and monitored by Foreign MSC 118. Foreign MSC 118 reports information about the visiting wireless telephone to HLR 134 assigned to the wireless device 127, including the on/off status of the visiting wireless telephone. Communication between HLRs and VLRs typically use IS-41 specification protocol, well known to those skilled in the art. Home MSC 119 is in communication with Foreign MSC 118 via a plurality of trunk circuits 136.

Home MSC 119 and Foreign MSC 118 are in communication with PSTN 125 via connections 137 and 138 to STP 102. In this manner, SCP 114 of PSTN 125 may communicate with any HLR or VLR in the wireless portion of telecommunications network 100. Accordingly, SCP 114 may be used to provide enhanced features to the wireless portion of telecommunications network 100, as discussed above with respect to PSTN 125 components.

Location-Based Call Forwarding

Figure 2:
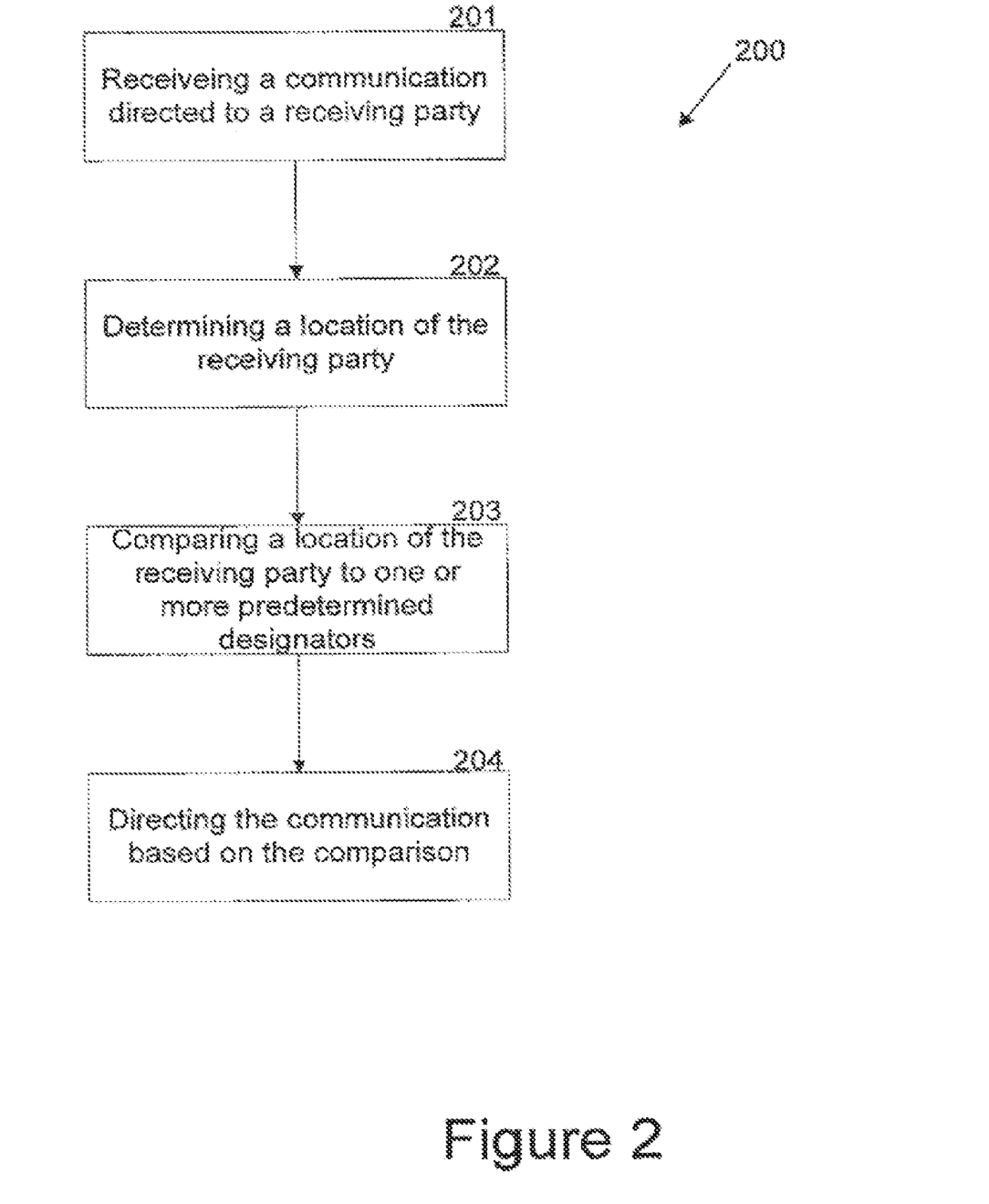
FIG. 2 is a flow diagram of a method for forwarding a communication, according to the invention.

FIG. 2 provides a flow diagram of a method 200 for forwarding a communication. Although the invention may be described in the context of the forwarding of a voice-based telephonic communication, it should be appreciated that other types of communication forwarding also are within the scope of the invention. For example, the invention may encompass the forwarding of a text-based communication, like an electronic mail (email), or the forwarding of data files, like graphics files. Also, the invention may include the forwarding of voice-based communication other than telephonic communications.

As shown in FIG. 2, in step 201, a communication that is directed to a receiving party is received. The receiving party may include called party's home telephone 124, as discussed with reference to FIG. 1, for example. In step 202, a location of the receiving party is determined. As will be discussed, determining a location of a receiving party may be accomplished in any number of ways, including providing on the receiving party's person a transponder that intermittently or continuously signals the location of the receiving party. In step 203, the location of the receiving party determined in step 202 is compared to one or more predetermined designators. As will be discussed, the predetermined designators may represent any designator to which the receiving party may desire communications to be forwarded. The predetermined designators may include, but not be limited to, telephone numbers, email addresses, Internet protocol (IP) addresses, or any other numeric or alphanumeric designator capable of identifying a communication device on a particular network.

In step 204, the communication is directed based on the comparison conducted in step 203. By directing the communication based on a comparison of the location of the received party to predetermined designators identified by the receiving party, the receiving party is more likely to receive the communication, as desired. This is to be distinguished from simply forwarding the communication to any of a number of predetermined designators, without knowing the present location of the received receiving party.

Figure 3:
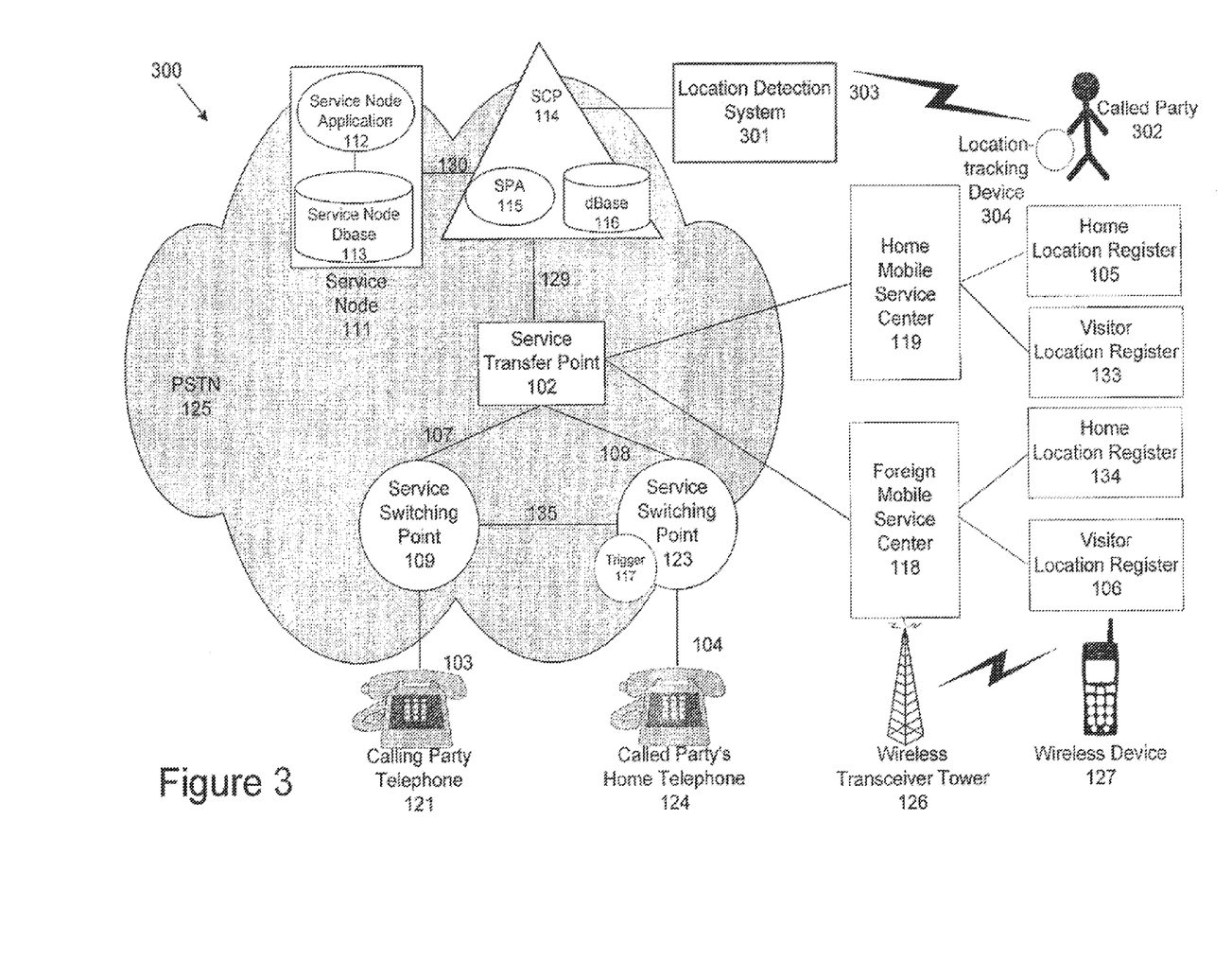
FIG. 3 is a block diagram of a system for forwarding a telephone call based on a location of a called party, according to the invention.

FIG. 3 provides a block diagram of a system 300 for forwarding a telephone call based on a location of a called party. As discussed, although the invention is described in the context of a telephonic-based communications over traditional telecommunications networks, it should be appreciated that the invention may include forwarding any type of communication over any available network.

As shown in FIG. 3, a system 300 includes many of the telecommunications network components described with reference to system 100 in FIG. 1. In addition, system 300 includes a location detection system 301 in communication with SCP 114. It should be appreciated that the term location detection system and "position detection device" (PDE) may be used interchangeably. Also, as shown in FIG. 3, system 300 includes a called party 302 in possession of a location-tracking device 304 capable of communicating location-based signals 303 to location detection system 301. It should be appreciated that location-tracking device 304 may be any commercially available device capable of signaling its location (and therefore the location of a called party in possession). Such signaling may include any technique capable of providing location information, including a global positioning system (GPS) device, and/or a radio frequency-based (rf) device, for example, but is not limited to such.

Location detection system 301 may include receivers and/or transmitters capable of communicating with a called party 302. In particular, location detection system 301 acts as a signaling "base station" to process signal 303 so as to identify a location of the called party 302. Therefore, location detection system 301 also may manipulate signal 303 in such a way that a traditional network component, like SCP 114 in a typical telecommunications network can properly use the data provided by signal 301. This may include using mathematical algorithms to convert the location data provided by location-tracking device 304 to data understandable by a component of the telecommunications network.

It should be appreciated that the comparison of the location signal to the predetermined designators, as discussed with reference to method 200 in FIG. 2, may be accomplished by location detection system. Alternatively, the comparison of the location signal to the predetermined designators, as discussed with reference to method 200 in FIG. 2, may be accomplished by any of certain components typically found in a telecommunications network, including SCP 114 and SN 111, for example. It should be appreciated, therefore, that the invention is not limited by the component that conducts the necessary comparison of the location of called party 302 to the predetermined designators.

Figure 4A:
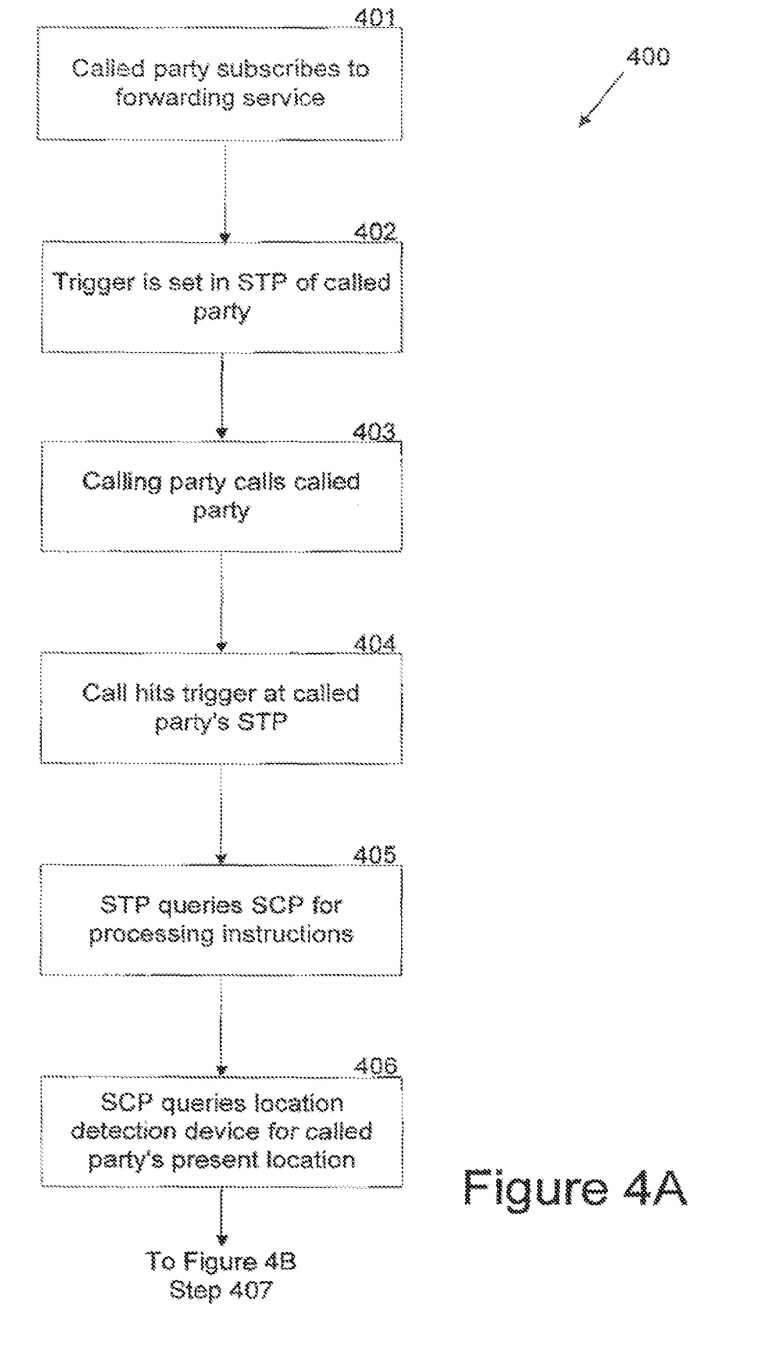
FIGS. 4A and 4B provide a flow diagram of a method of forwarding a telephone call, according to the invention.
Figure 4B:
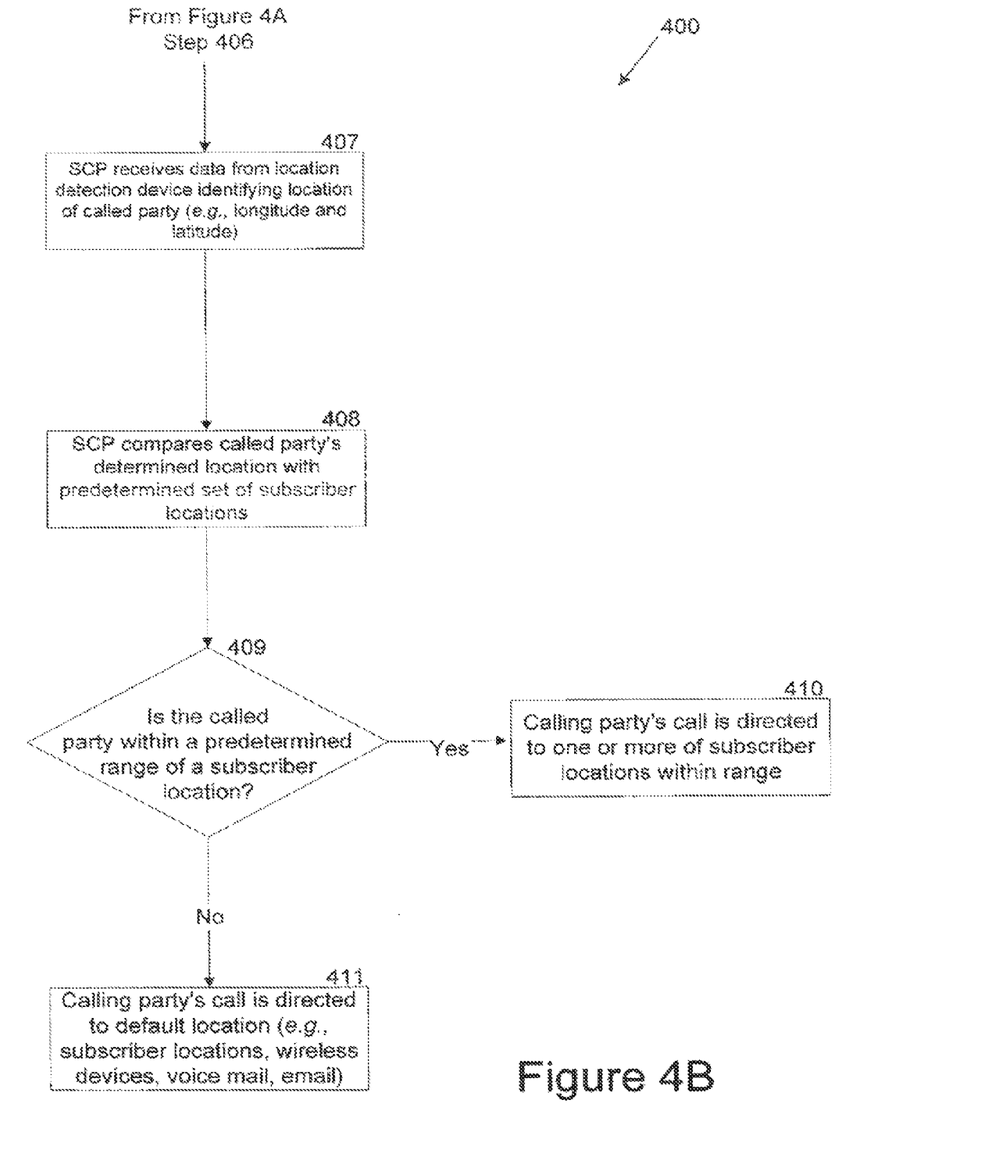

FIGS. 4A and 4B provide a flow diagram of a method 400 of forwarding a telephone call. Although method 400 is described in the context of a telephone call, it should be appreciated that the method equally applies to the direction of other type of communications. The invention is described in the context of a telephonic-based communication in a typical telecommunications network to facilitate an understanding of the invention.

As shown in FIG. 4A, in step 401, a called party subscribes to a forwarding service. As a result of the subscription to the forwarding service, a network administrator may establish at trigger 117 in SSP 102 of called party's home telephone 124. As discussed with reference to FIG. 1, trigger 117 may be set in any STP related to the called party, for example, the called party's home telephone 124. It should be appreciated that trigger 117 may be set in any SSP within the telecommunications network capable of facilitating the forwarding service for the called party. For example, trigger 117 may be set in a SSP associated with the called party's work telephone number, which may be a different SSP than called party's home telephone 124.

In step 403, a calling party 121 calls called party's home telephone 124 by dialing certain digits that identify the subscriber location of telephone 124. A signal associated with the calling party's telephone call travels through SSP 109 and is routed to SSP 123, where trigger 117 is encountered, in step 404. In response to trigger 117, in step 405, STP 123 routes the call to STP 102, and STP 102 queries SCP 114 for call processing instructions. As a result of the query required by trigger 117, SCP 114 recognizes that it must determine the location of called party 302, or to any party associated with called party's home telephone 124 (e.g., groups of people). In step 406, SCP 114 queries location detection system 301 for the location of the called party 302. Although step 406 describes SCP 114 querying location detection system 301, it should be appreciated that the location of called party 302 may be previously provided by location detection system 301 to SCP 114 and stored in database 116. Alternatively, the location of called party 302 may be stored in any data storage device within the telecommunications network to which SCP 114 has access and may retrieve the location of called party 302.

As shown in FIG. 4B, in step 407, SCP 114 receives data from location detection system 301 that identifies a location of called party 302. The data provided by location detection system 301 to SCP 114 may be any type of data typically used to identify a location, for example, a longitude and a latitude of the called party 302 provided by a GPS-based system. In step 408, SCP 114 compares the location of called party 302 received from location detection system 301 with a predetermined set of other locations. The predetermined set of other locations may be telephone subscriber locations that have been previously entered by called party 302 to SCP 114.

This predetermined set of subscriber locations may represent a series of subscriber locations that called party 302 frequents. Alternatively, called party 302 may update the subscriber locations as he/she travels. For example, in an emergency situation a doctor may be permitted to designate the phone number of a public baseball park on a particular time and day at which the doctor is visiting the park. Therefore, the doctor/subscriber may be permitted to temporarily designate certain subscriber locations, based on expected travel plans. Alternatively, the predetermined designators may not be identified by the subscriber, but may be determined by the telephone service provider in real-time. For example, the telephone service provider may forward a call to a bank of public pay telephones that called party 302 happens to be passing at the time the telephone call is received from the calling party. Therefore, it should be appreciated that the call from the calling party may be forwarded to any communication device within the network, to which the called party 302 is nearest at the time the call is processed.

In step 409, it is determined whether called party 302 is within a predetermined range of one or more subscriber locations. The predetermined range may represent any preset distance from a subscriber location, for example, 500 feet. If it is determined that the called party is within a predetermined range of a particular subscriber location, SCP 114 directs the call received from calling party 121 to one or more of the subscribed locations within the predetermined range, in step 410. If, on the other hand, the called party is not within a predetermined range of a subscriber location, in step 311, the call from calling party 121 may be directed to one or more default locations. The default locations may be any subscriber location (previously designated by the called party or otherwise), including one or more wireless devices, a voicemail system, and/or an email system, for example.

Figure 5:
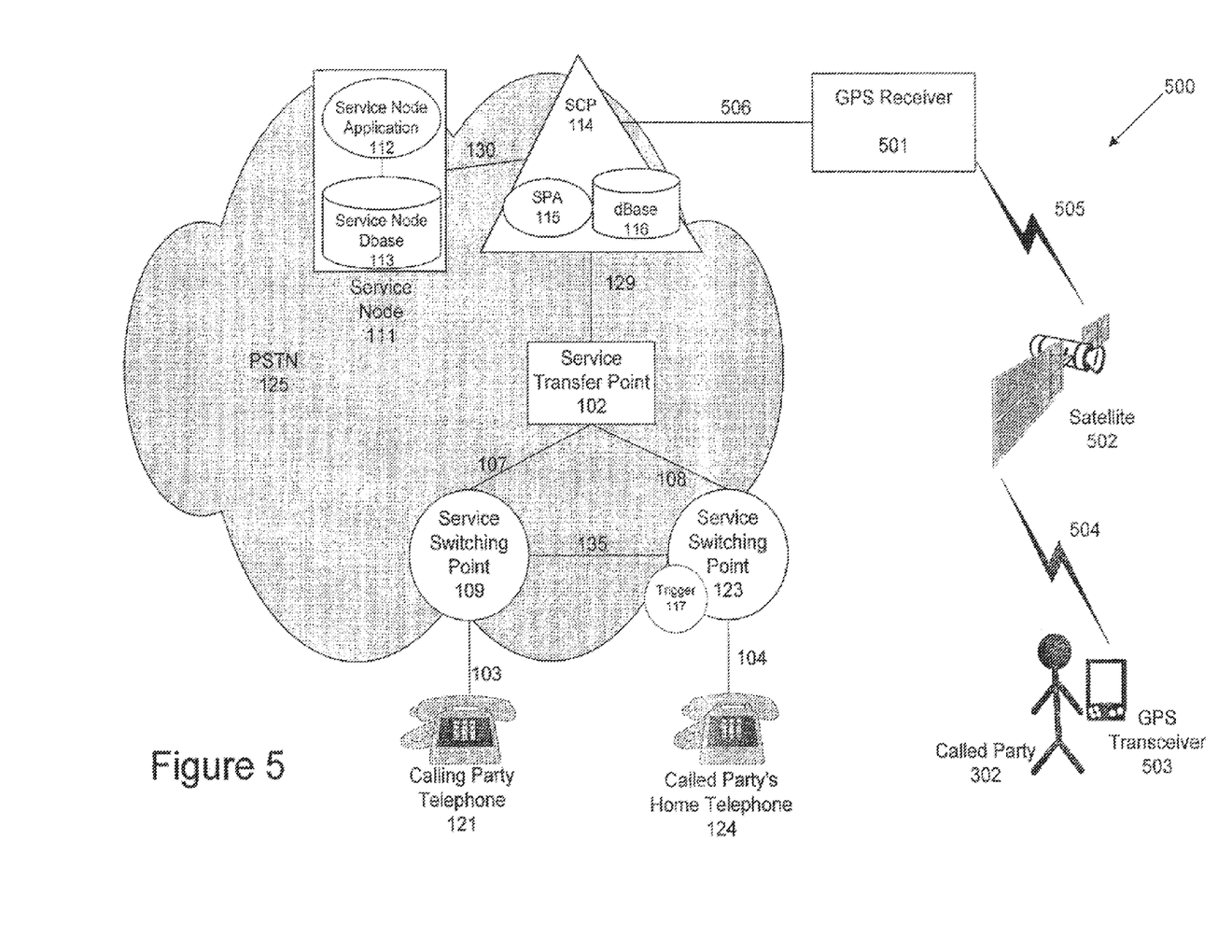
FIG. 5 is a block diagram of a GPS-based location system for forwarding a communication to a called party, according to the invention.
Figure 6:
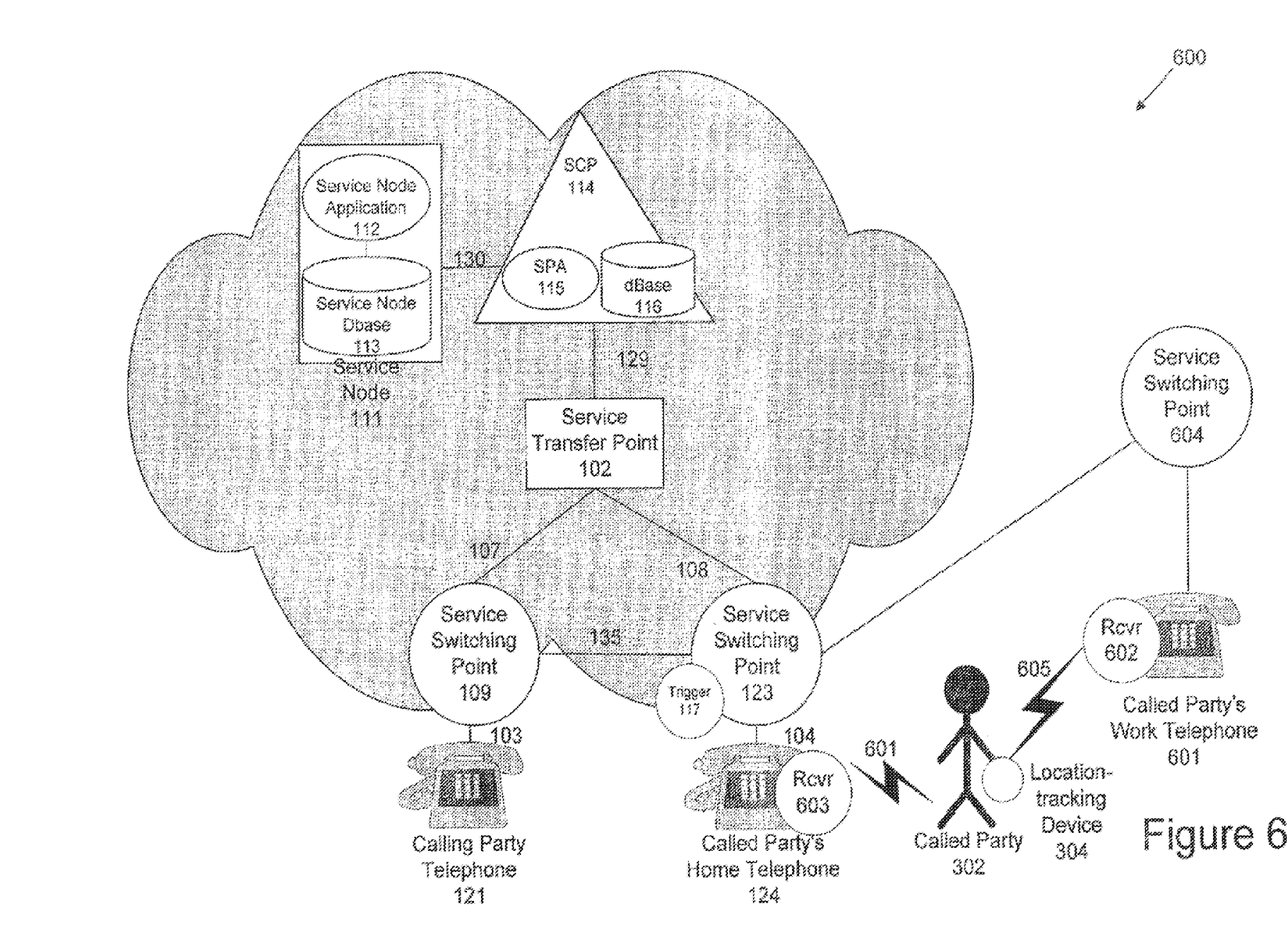
FIG. 6 is a block diagram of another technique for forwarding a communication to a called party, according to the invention.

Although the discussion with reference to FIGS. 3 and 4, describes the process of locating called party 302 using a device located on the person called party 302 to communicate with SCP 114 via location detection system 301, it should be appreciated that other techniques are contemplated by the invention. For example, the location of called party 302 may enter the telecommunications network, and so location-tracking device 304 associated with called party 302 may communicate with devices other than SCP 114. Also, various systems capable of identifying a location of called party 302 are contemplated by the invention. FIGS. 5 and 6 provide such alternatives.

FIG. 5 is a block diagram of a GPS-based location system for forwarding a communication to a called party. As shown in FIG. 5, called party 302 is in possession of a GPS transceiver 503. GPS transceiver 503 may be used to provide a location of called party 302. In particular, GPS transceiver 503 transmits a signal 504 to a satellite 502. Satellite 502 then retransmits a signal 505 to a GPS receiver 501. GPS receiver 501 provides the location of GPS transceiver 503, and therefore of called party 302 to SCP 114. As discussed, it should be appreciated that GPS transceiver 503 and GPS receiver 501 may be commercially available devices. Also, GPS receiver 501 may have software or hardware components capable of translating the location information provided by GPS transceiver to data understandable by SCP 114. It should also be appreciated that GPS receiver 501 may communicate with components other than SCP 114 within the telecommunications network. In addition, it should be appreciated that the functionality of GPS receiver 501 may be incorporated within any of the components within the telecommunications network, including SCP 114, for example.

In addition to identifying a longitude and latitude, for example, of GPS transceiver 503, GPS transceiver 503 may provide a unique identification number associated with called party 302. In this way, GPS transceiver 503 is able to identify a location of a particular called party 302 who has been assigned the unique identification number. For example, the unique identifier may be a home and/or work telephone number of called party 302 that is stored in GPS transceiver 503. Each time that GPS transceiver provides to SCP 114 (via GPS receiver 501) the location of called party 302, it also provides an identifier associated with called party 302. SCP 114 is therefore able to associate or map the location of called party 302 with the identity of called party 302. Such mapping may be stored in database 116 within SCP 114, or may be stored within a data store (not shown) located within GPS receiver 501. In any case, SCP 114 is provided with a signal 506 that identifies called party 302 as well as the location of called party 302 via GPS transceiver 503. The data provided by signal 506 may be stored for any period of time in any component in the telecommunications network.

FIG. 6 is a block diagram of another technique for forwarding a communication based on the location of called party 302. As shown in FIG. 6, called party 302 is in possession of location-tracking device 304 that is capable of transmitting a location signal 601 and/or 605 to receivers 603 and 602, respectively, located on a particular telephone. Therefore, the invention contemplates allowing called party 302 to communicate his/her, location directly to the nearest telephone unit. Such communication may occur while the telephone is "on-hook" or "off-hook." It should be appreciated that receivers 602 and 603 may be integrated within the telephones or may be separate devices that are coupled to the telephones.

In operation, when called party 302 comes within a predetermined range of called party's home telephone 124, for example, location-tracking device 304 on called party's person transmits a signal 601 to receiver 603 located within or in communication with called party's home telephone 124. Receiver 603 may then transmit a signal to SSP 123 and onto SCP 114. In this way, SCP 114 will be provided with data so as to associate the location of called party 302 with called party's home telephone 124.

As previously described, when an incoming call (e.g., from calling party 121) enters SSP 123 it will encounter trigger 117. Trigger 117 will initiate SCP 114 to query database 116 to provide call processing instructions to SIP 102 from SCP 114. Database 116 may have an entry indicating that all calls directed to call party 302 should be directed and/or forwarded to call party's home telephone 124, for example.

On the other hand, if call party 302 moves within a predetermined range of call party's work telephone 601, for example, a signal 605 will be received by receiver 602. Receiver 602 will provide SCP 114 with a signal via SSP 123 indicating that called party 302 is within a predetermined range of called party's work telephone 601. As a result, a telephone call directed by calling party 121 to called party 202 will encounter trigger 117 in SIP 102. SCP 114 will be queried by STP 102, because of trigger 117, for call processing instructions. SCP 114 may have an entry in its database 116 (or in another data store located accessible by the telecommunications network) identifying a location of called party 302 as being called party's work telephone 601. As a result, SCP 114 will direct the call from calling party 121 to called party's work telephone 601 via SSP 604 and STP 102. It should be appreciated that the invention contemplates that called party 302 may communicate his/her location with any of a number of components within the telecommunications network including, a telephone, a location detection system 301, and/or a service node, for example. Therefore, it should be appreciated that the location of called party 302 may be identified to any one of a number of components typically found in a telecommunication system.

If calling party 302 is not within a proximity of a predefined subscriber location, the communication may be forwarded to certain default locations. For example, the communication may be forward to an email server, a voice mail system, and a wireless telephone. Alternatively, the communication may be forwarded to another user based on the location of the other user. For example, a user may desire all calls to be forwarded to his/her spouse, should the primary user be out of proximity of any predefined location.

Figure 7:
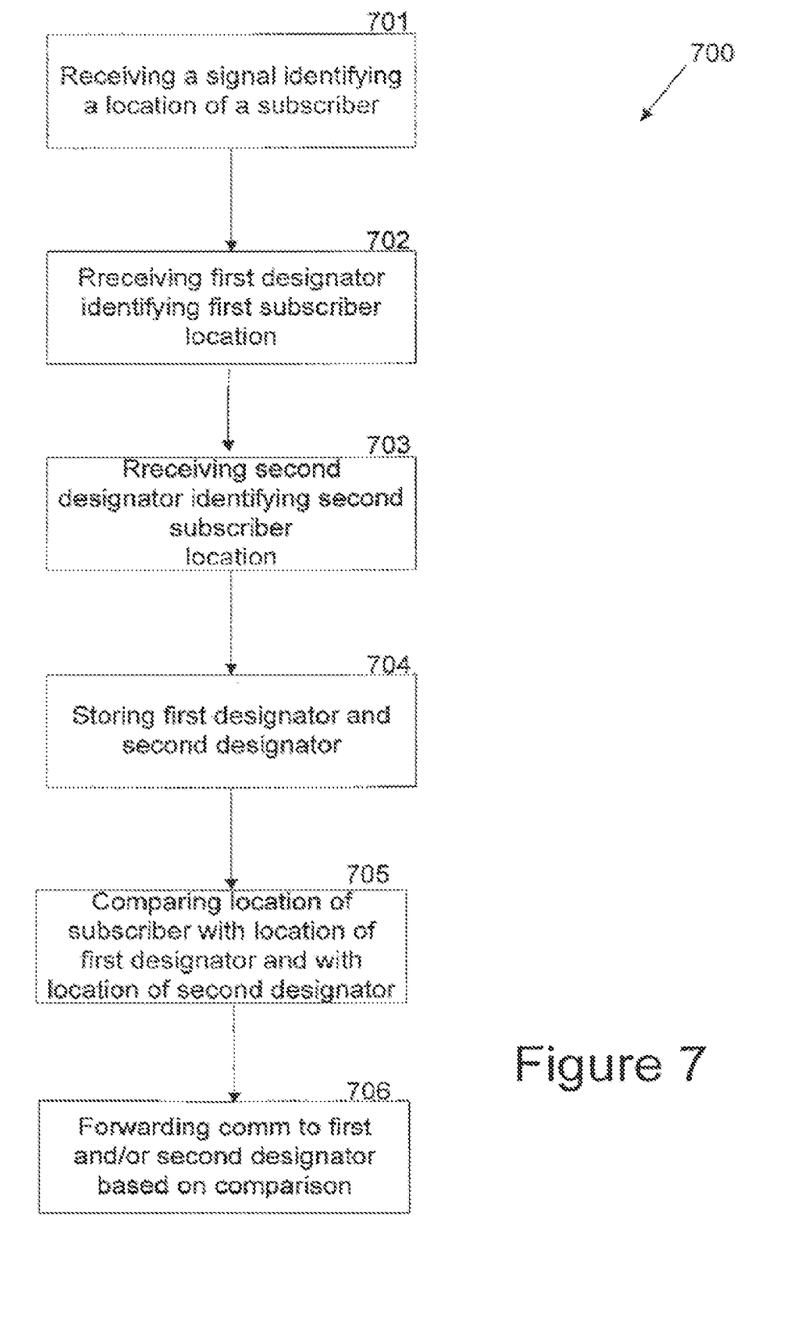
FIG. 7 is a flow diagram of a method for providing for the forwarding of a communication, according to the invention.

The invention further includes providing services capable of allowing called party 302 to subscribe to such forwarding services. FIG. 7 is a flow diagram of a method 700 for providing for the forwarding of a communication. As shown in FIG. 7, in step 701, a signal identifying a location of a subscriber is received. In step 702, a first designator (e.g., a telephone number) is received from the subscriber that identifies a first subscriber location (e.g., home telephone number). In step 703, a second designator is received from the subscriber that identifies a second subscriber location (e.g., work telephone number). Additional designators may be provided by the subscriber for other subscriber locations. In step 704, the first and second designators are stored for later comparison with a location of the subscriber. In step 705, after a location of the subscriber is determined, the location is compared with the designators identified by the subscriber. In step 706, the communication is forwarded to the first and/or second designator (or any other defined designator) based on the comparison.

The invention is directed to a system and method for forwarding a communication. The invention was described in the context of wired voice and data communication system, but is not so limited to, regardless of any specific description in the drawing or examples set forth herein. It will be understood that the invention is not limited to use of any of the particular components or devices herein. Indeed, this invention can be used in any application that requires the testing of a communications system. Further, the system disclosed in the invention can be used with the method of the invention or a variety of other applications.

While the invention has been particularly shown and described with reference to the embodiments thereof, it will be understood by those skilled in the art that the invention is not limited to the embodiments specifically disclosed herein. Those skilled in the art will appreciate that various changes and adaptations of the invention may be made in the form and details of these embodiments without departing from the true spirit and scope of the invention as defined by the following claims.

What is claimed is:

1. A method for directing a communication, comprising:
   receiving, from a called party, a called-party-defined subscriber location;
   receiving, from a service provider, a service-provider-defined subscriber location;
   receiving a temporary subscriber location;
   receiving a telephone call from a calling party to the called party at an original subscriber location;
   determining a current location of the called party;
   determining a proximity of the current location of the called party to the called-party-defined subscriber location, the service-provider-defined subscriber location, and the temporary subscriber location; and
   directing the telephone call from the original subscriber location to one or more of the called-party-defined subscriber location, the service-provider-defined subscriber location, and the temporary subscriber location, based on the proximity.

2. The method of claim 1, wherein directing the telephone call from the original subscriber location to one or more of the called-party-defined subscriber location, the service-provider-defined subscriber location, and the temporary subscriber location, based on the proximity comprises:
   determining whether the proximity is within a predetermined range of one or more of the called-party-defined subscriber location, the service-provider-defined subscriber location, and the temporary subscriber location;
   in response to determining that the proximity is within the predetermined range of the called-party-defined subscriber location, directing the telephone call from the original subscriber location to the called party defined subscriber location;
   in response to determining that the proximity is within the predetermined range of the service-provider-defined subscriber location, directing the telephone call from the original subscriber location to the service-provider-defined subscriber location;
   in response to determining that the proximity is within the predetermined range of the temporary subscriber location, directing the telephone call from the original subscriber location to the temporary subscriber location; and in response to determining that the proximity is not within the predetermined range of the called-party-defined subscriber location, the service-provider-defined subscriber location, and the temporary subscriber location, directing the telephone call from the original subscriber location to a default location.

3. The method of claim 2, wherein each of the called-party-defined subscriber location, the service-provider-defined subscriber location, and the temporary subscriber location is associated with the called party.

4. The method of claim 3, wherein the default location is associated with a third party different from the called party.

5. The method of claim 4, wherein the default location comprises a telephone number associated with the third party.

6. The method of claim 1, wherein receiving the temporary subscriber location comprises receiving multiple temporary subscriber locations based on expected travel plans of the called party.

7. The method of claim 1, wherein determining the current location of the called party comprises:
   querying a location detection system for the current location of the called party; and
   receiving the current location of the called party from the location detection system.

8. A system for directing a communication, comprising:
   a memory for storing a program containing code for directing the communication; and
   a processor functionally coupled to the memory, the processor being responsive to computer-executable instructions contained in the program and configured to at least
      receive, from a called party, a called-party-defined subscriber location
      receive, from a service provider, a service-provider-defined subscriber location,
      receive a temporary subscriber location,
      receive a telephone call from a calling party to the called party at an original subscriber location,
      determine a current location of the called party,
      determine a proximity of the current location of the called party to the called-party-defined subscriber location, the service-provider-defined subscriber location, and the temporary subscriber location, and
      direct the telephone call from the original subscriber location to one or more of the called-party-defined subscriber location, the service-provider-defined subscriber location, and the temporary subscriber location, based on the proximity.

9. The system of claim 8, wherein to direct the telephone call to one or more of the called-party-defined subscriber location, the service-provider-defined subscriber location, and the temporary subscriber location, based on the proximity, the processor is further configured to at least
   determine whether the proximity is within a predetermined range of one or more of the called-party-defined subscriber location, the service-provider-defined subscriber location, and the temporary subscriber location,
   in response to determining that the proximity is within the predetermined range of the called-party-defined subscriber location, direct the telephone call from the original subscriber location to the called-party-defined subscriber location,
   in response to determining that the proximity is within the predetermined range of the service-provider-defined subscriber location, direct the telephone call from the original subscriber location to the service-provider-defined subscriber location,
   in response to determining that the proximity is within the predetermined range of the temporary subscriber location, direct the telephone call from the original subscriber location to the temporary subscriber location, and
   in response to determining that the proximity is not within the called-party-defined subscriber location, the service-provider-defined subscriber location, and the temporary subscriber location, direct the telephone call from the original subscriber location to a default location.

10. The system of claim 9, wherein each of the called-party-defined subscriber location, the service-provider-defined subscriber location, and the temporary subscriber location is associated with the called party.

11. The system of claim 10, wherein the default location is associated with a third party different from the called party.

12. The system of claim 11, wherein the default location comprises a telephone number associated with the third party.

13. The system of claim 8, wherein to receive the temporary subscriber location, the processor is further configured to at least receive multiple temporary subscriber locations based on expected travel plans of the called party.

14. A non-transitory computer-readable medium having instructions stored thereon for execution by a processor to provide a method for directing a communication, the method comprising:
   receiving, from a called party, a called-party-defined subscriber location;
   receiving, from a service provider, a service-provider-defined subscriber location;
   receiving a temporary subscriber location;
   receiving a telephone call from a calling party to the called party at an original subscriber location;
   determining a current location of the called party;
   determining a proximity of the current location of the called party to the called-party-defined subscriber location, the service-provider-defined subscriber location, and the temporary subscriber location; and
   directing the telephone call from the original subscriber location to one or more of the called-party-defined subscriber location, the service-provider-defined subscriber location, and the temporary subscriber location on the proximity.

15. The non-transitory computer-readable medium of claim 14, wherein directing the telephone call to one or more of the called-party-defined subscriber location, the service-provider-defined subscriber location, and the temporary subscriber location, based on the proximity comprises:
   determining whether the proximity is within a predetermined range of one or more of the called-party-defined subscriber location, the service-provider-defined subscriber location, and the temporary subscriber location;
   in response to determining that the proximity is within the predetermined range of the called-party-defined subscriber location, directing the telephone call from the original subscriber location to the called-party defined subscriber location;
   in response to determining that the proximity is within the predetermined range of the service-provider-defined subscriber location, directing the telephone call from the original subscriber location to the service-provider-defined subscriber location;
   in response to determining that the proximity is within the predetermined range of the temporary subscriber location, directing the telephone call from the original subscriber location to the temporary subscriber location; and in response to determining that the proximity is not within the predetermined range of the called-party-defined subscriber location, the service-provider-defined subscriber location, and the temporary subscriber location, directing the telephone call from the original subscriber location to a default location.

16. The non-transitory computer-readable medium of claim 15, wherein each of the called-party-defined subscriber location, the service-provider-defined subscriber location, and the temporary subscriber location is associated with the called party.

17. The non-transitory computer-readable medium of claim 16, wherein the default location is associated with a third party different from the called party.

18. The non-transitory computer-readable medium of claim 17, wherein the default location comprises a telephone number associated with the third party.

19. The non-transitory computer-readable medium of claim 14, wherein receiving a the temporary subscriber location comprises receiving multiple temporary subscriber locations based on expected travel plans of the called party.

20. The non-transitory computer-readable medium of claim 14, wherein determining the current location of the called party comprises:
    querying a location detection system for the current location of the called party; and
    receiving the current location of the called party from the location detection system.

* * * * *

UNITED STATES PATENT AND TRADEMARK OFFICE
CERTIFICATE OF CORRECTION

| | |
|---|---|
| PATENT NO. | : 8,068,854 B2 |
| APPLICATION NO. | : 12/646461 |
| DATED | : November 29, 2011 |
| INVENTOR(S) | : Contractor |

It is certified that error appears in the above-identified patent and that said Letters Patent is hereby corrected as shown below:

In Claim 2, Column 12, Line 56, please delete the words "called party defined" and replace with the phrase --called-party-defined--.

Signed and Sealed this
Third Day of January, 2012

David J. Kappos
*Director of the United States Patent and Trademark Office*